(12) United States Patent
Hobbs et al.

(10) Patent No.: US 12,481,997 B2
(45) Date of Patent: Nov. 25, 2025

(54) SYSTEM AND METHOD FOR OPTIMIZATION OF FRAUD DETECTION MODEL

(71) Applicant: THE TORONTO-DOMINION BANK, Toronto (CA)

(72) Inventors: Steven Thomas Hobbs, Toronto (CA); Yifan Wang, North York (CA)

(73) Assignee: THE TORONTO-DOMINION BANK, Toronto (CA)

( * ) Notice: Subject to any disclaimer, the term of this patent is extended or adjusted under 35 U.S.C. 154(b) by 543 days.

(21) Appl. No.: 17/243,307

(22) Filed: Apr. 28, 2021

(65) Prior Publication Data

US 2022/0351207 A1  Nov. 3, 2022

(51) Int. Cl.
G06Q 20/00 (2012.01)
G06Q 20/40 (2012.01)
G06Q 30/0283 (2023.01)

(52) U.S. Cl.
CPC ..... G06Q 20/4016 (2013.01); G06Q 30/0283 (2013.01)

(58) Field of Classification Search
CPC .................................................. G06Q 20/4016
See application file for complete search history.

(56) References Cited

U.S. PATENT DOCUMENTS 5,819,226 A   10/1998  Gopinathan et al.
7,403,922 B1 *  7/2008  Lewis .................... G06Q 20/40
                                                        705/38

(Continued)

FOREIGN PATENT DOCUMENTS

CA         2855168 A1    1/2015
WO    WO-2017091448 A1 *  6/2017   ......... G06Q 20/4016

(Continued)

OTHER PUBLICATIONS

Credit Card Fraud Detection under Extreme Imbalanced Data: a Comparative Study of Data-level AlgorithmsJournal of Experimental & Theoretical Artificial Intelligence 2022, vol. 34, No. 4, 571-598 https://doi.org/10.1080/0952813X.2021. 1907795.*

(Continued)

*Primary Examiner* — Richard C Weisberger (57) ABSTRACT

There is provided a computing system for optimizing a plurality of fraud detection strategies used to generate a corresponding set of potentially fraudulent transactions. The system determines an overall fraud value such as an average fraud value for each transaction based on pre-defined factors and identifies a particular strategy having a highest average fraud value for its fraudulent transactions as a highest priority on a ranked list of strategies. The system is configured to remove each transaction from the remaining other strategies if the same as the fraudulent transactions in the identified strategy and calculate an average fraud value for the remaining other strategies. The system then ranks the next highest priority fraud detection strategy having the highest average fraud value while removing its corresponding transactions flagged from other remaining strategies and repeat the ranking until all the strategies have been ranked and apply the ranked list to subsequent transactions.

10 Claims, 5 Drawing Sheets

(56) References Cited

U.S. PATENT DOCUMENTS

| | | |
|---|---|---|
| 7,657,497 B2 | 2/2010 | Nandy |
| 10,607,228 B1 | 3/2020 | Gai et al. |
| 10,628,826 B2* | 4/2020 | Yu .................... G06Q 10/0635 |
| 10,867,303 B1 | 12/2020 | Manapat et al. |
| 11,538,037 B2* | 12/2022 | Hart .................. G06Q 20/4016 |
| 11,954,689 B2* | 4/2024 | Hart ...................... H04L 63/102 |
| 2011/0173116 A1* | 7/2011 | Yan ...................... G06Q 10/067 |
| | | 705/348 |
| 2017/0243221 A1* | 8/2017 | Gill .................... G06Q 20/4016 |
| 2022/0351207 A1* | 11/2022 | Hobbs ................ G06Q 30/0283 |
| 2023/0267468 A1* | 8/2023 | Tholar .................. G06Q 90/00 |
| | | 706/12 |

FOREIGN PATENT DOCUMENTS

| | | |
|---|---|---|
| WO | 2018/193085 A1 | 10/2018 |
| WO | WO-2024159404 A1 * | 8/2024 |

OTHER PUBLICATIONS

Sailusha , Credit Card Fraud Detection Using Machine Learning IEEE 2020.*

Gianini, Gabriele et al., 2020. Managing a pool of rules for credit card fraud detection by a Game Theory based approach. Future Generation Computer Systems, vol. 102: pp. 549-561.

* cited by examiner

SYSTEM AND METHOD FOR OPTIMIZATION OF FRAUD DETECTION MODEL

FIELD

The present disclosure relates to a system and method for optimizing fraud detection model(s) by proactively and automatically reviewing fraud detection rules on the system in order to rank them for identifying fraudulent transactions.

BACKGROUND

Fraud system and transaction flow is a multi to multi process set up. Notably, one fraud detection strategy could flag multiple transactions as suspicious (alert), and one transaction could be alerted by multiple strategies. Therefore, at any given time, how to choose and rank alerts being generated, especially considering the possible overlaps and duplication, and best use the limited operational power is a key technical challenge of computing systems. The additional computer resources required to interpret and process such duplications and overlaps becomes a bottleneck for prompt identification of fraudulent transactions. Additionally, the existing fraud systems waste additional resources as they are unable to adequately evaluate fraud alerts and flag transactions, which are unlikely to be fraudulent in a similar manner as those that are highly likely to be fraudulent. This approach is thus resource intensive as it requires processing and alerts of overlapping transactions marked as fraudulent and uses computer resources in an inefficient manner to lead the user to unlikely and erroneous sources of fraud.

A need therefore exists for an improved automated method, device and system for optimization of fraud detection model(s). Accordingly, a computer implemented solution that addresses, at least in part, the above and other shortcomings is desired.

SUMMARY

In at least one aspect, there is provided a device for optimizing and ranking a plurality of fraud detection strategies, the device comprising a processor, a storage device and a communication device, the storage device storing instructions, which when executed by the processor, configure the device to: (a) apply each of the fraud detection strategies to a set of transactions to determine a subset of potentially fraudulent transactions provided for each of the strategies; (b) determine a fraud value for each of the potentially fraudulent transactions for each of the strategies based on one or more pre-defined factors; (c) determine an overall fraud value from the fraud value of the potentially fraudulent transactions for each of the strategies; (d) identify a first strategy from the fraud detection strategies having a highest overall fraud value for respective potentially fraudulent transactions associated with the first strategy as compared to remaining other strategies and corresponding potentially fraudulent transactions and define the first strategy as having a highest priority on a ranked list of the fraud detection strategies; (e) remove one or more transactions from the subset of potentially fraudulent transactions from the remaining other strategies if overlapping with one or more of the respective potentially fraudulent transactions from the first strategy; (f) identify a subsequent strategy from the fraud detection strategies having a next highest overall fraud value for its associated potentially fraudulent transactions and add to the ranked list of fraud detection strategies while removing from consideration, each of the fraud detection strategies with potentially fraudulent transactions associated with previously identified strategies in the ranked list; (g) repeat step (f) to rank all remaining strategies from the fraud detection strategies in the ranked list until no further strategies left for ranking while subsequent to each ranking, removing corresponding transactions identified in the ranking from the fraud detection strategies; and (h) apply the ranked list of fraud detection strategies to subsequent transactions for determining subsequent potentially fraudulent transactions.

In yet another aspect, there is provided a computer implemented method for optimizing and ranking a plurality of fraud detection strategies, the method comprising: (a) applying each of the fraud detection strategies to a set of transactions to determine a subset of potentially fraudulent transactions provided for each of the strategies; (b) determining a fraud value for each of the potentially fraudulent transactions for each of the strategies based on one or more pre-defined factors; (c) determining an overall fraud value (e.g. average value per transaction for each model) from the fraud value of the potentially fraudulent transactions for each of the strategies; (d) identifying a first strategy from the fraud detection strategies having a highest overall fraud value for respective potentially fraudulent transactions associated with the first strategy as compared to remaining other strategies and corresponding potentially fraudulent transactions and define the first strategy as having a highest priority on a ranked list of the fraud detection strategies; (e) removing one or more transactions from the subset of potentially fraudulent transactions from the remaining other strategies if overlapping with one or more of the respective potentially fraudulent transactions from the first strategy; (f) identifying a subsequent strategy from the fraud detection strategies having a next highest overall fraud value for its associated potentially fraudulent transactions and add to the ranked list of fraud detection strategies while removing from consideration, each of the fraud detection strategies with potentially fraudulent transactions associated with previously identified strategies in the ranked list; (g) repeat step (f) for ranking all remaining strategies from the fraud detection strategies in the ranked list until no further strategies left for ranking while subsequent to each ranking, removing corresponding transactions identified in the ranking from the fraud detection strategies; and (h) applying the ranked list of fraud detection strategies to subsequent transactions for determining subsequent potentially fraudulent transactions.

In yet another aspect, there is provided a computing system for optimizing fraud detection models applied to computer transactions communicated across the system for detecting potential fraud, the system comprising a processor and a memory in communication with the processor, the memory storing instructions that, when executed by the processor, configure the computing system to: retrieve a set of transactions flagged as fraud by previously applying the fraud detection models and associate each transaction flagged with one or more of the fraud detection models; determine a fraud face value for each flagged transaction based on a value to the system for flagging the flagged transaction as fraud; determine, for each of the fraud detection models, an average of the fraud face value per transaction flagged as fraudulent; rank a particular model as a highest in a ranked list of the models based on a highest average of the fraud face value and remove any transactions flagged by the particular model from remaining other fraud detection models; determine an updated average fraud face value per alert for the remaining other fraud detection models; rank a next model based on a highest updated average fraud face value on the ranked list while removing overlapping transactions between the next model and remaining other fraud detection models and repeat ranking process until the models have all been ranked; and apply the ranked list of the models to subsequent transactions for detection of fraud.

In yet another aspect, there is provided a computer program product comprising a non-transient storage device storing instructions that when executed by at least one processor of a computing device for optimizing and ranking a plurality of fraud detection strategies, configure the computing device to: (a) apply each of the fraud detection strategies to a set of transactions to determine a subset of potentially fraudulent transactions provided for each of the strategies; (b) determine a fraud value for each of the potentially fraudulent transactions for each of the strategies based on one or more pre-defined factors; (c) determine an overall fraud value from the fraud value of the potentially fraudulent transactions for each of the strategies; (d) identify a first strategy from the fraud detection strategies having a highest overall fraud value (e.g. highest average fraud value) for respective potentially fraudulent transactions associated with the first strategy as compared to remaining other strategies and corresponding potentially fraudulent transactions and define the first strategy as having a highest priority on a ranked list of the fraud detection strategies; (e) remove one or more transactions from the subset of potentially fraudulent transactions from the remaining other strategies if overlapping with one or more of the respective potentially fraudulent transactions from the first strategy;(f) identify a subsequent strategy from the fraud detection strategies having a next highest overall fraud value for its associated potentially fraudulent transactions and add to the ranked list of fraud detection strategies while removing from consideration, each of the fraud detection strategies with potentially fraudulent transactions associated with previously identified strategies in the ranked list; (g) repeat step (f) to rank all remaining strategies from the fraud detection strategies in the ranked list until no further strategies left for ranking while subsequent to each ranking, removing corresponding transactions identified in the ranking from the fraud detection strategies; and (h) apply the ranked list of fraud detection strategies to subsequent transactions for determining subsequent potentially fraudulent transactions.

These and other aspects will be apparent including computer program products that store instructions in a non-transitory manner (e.g. in a storage device) that, when executed by a computing device, configure the device to perform operations as described herein.

Further features of the disclosed systems and methods and the advantages offered thereby, are explained in greater detail hereinafter with reference to specific embodiments illustrated in the accompanying drawings, wherein like elements are indicated be like reference numbers and designators.

BRIEF DESCRIPTION OF THE DRAWINGS

These and other features of the disclosure will become more apparent from the following description in which reference is made to the appended drawings wherein.

DETAILED DESCRIPTION

One or more currently preferred embodiments have been described by way of example. It will be apparent to persons skilled in the art that a number of variations and modifications can be made without departing from the scope of the invention as defined in the claims.

Fraud detection systems use a parallel transaction scanning system where a single transaction could be flagged suspicious by various different fraud rules/models, while a given fraud rule or model could flag multiple transactions in a given period. This situation creates difficulty in evaluating each individual rule/model's net contribution to the overall fraud detection and mitigation as there could be a lot of duplications and overlapping. Additionally, prior systems are time consuming and error prone as they unnecessarily flag overlapping and duplicate transactions and their effectiveness is difficult to determine.

According to an aspect of the present disclosure there is provided a method to leverage domestic database automation with a defined benefit equation that helps evaluate and rank all fraud detecting rules/models via a customized use of forward selection algorithm.

Figure 1:
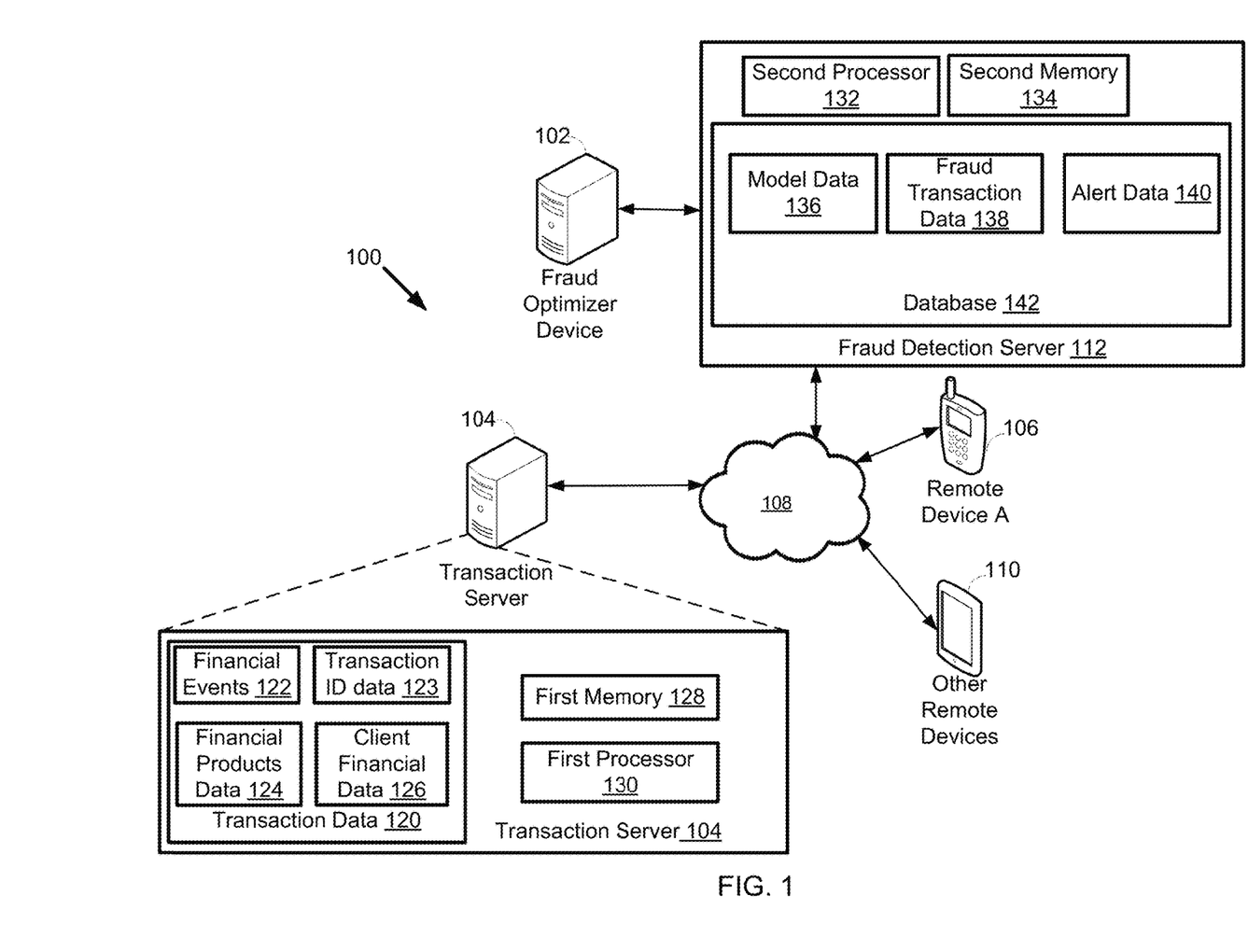
FIG. 1 is a diagram illustrating an example computing device (e.g. a fraud optimizer device), communicating in a communication network and configured to provide automatic and dynamic optimization of fraud models utilized by a fraud detection system such as a fraud detection server, in accordance with one or more aspects of the present disclosure.

Generally and referring to FIG. 1, the current disclosure relates to a computing device, such as a fraud optimizer device 102 having a simulation processing engine that looks through all of the fraud detection rules/models that are on a computer system 100 (e.g. as provided from a fraud detection server 112) and aims to optimize the rules/models (e.g. stored as model data 136) in an effort to limit computing resources spent on fraudulent transactions.

FIG. 1 is a diagram illustrating an example computer system 100 in which the computing device referred to as the fraud optimizer device 102 is configured to communicate with one or more other computing devices, including a fraud detection server 112, a transaction processing device referred to as a transaction server 104, a remote device 106 and other remote devices 110 using a communications network 108. Transaction server 104 comprises a first memory 128, a first processor 130, and transaction data 120 stored in data stores (not shown) coupled thereto. The transaction server 104 may further comprise communication means for communicating with other computing devices in the system 100 such as the fraud detection server 112, remote device 106, other remote devices 110 and/or fraud optimizer device 102 across the communications network 108. It is understood that this is a simplified illustration.

Transaction server 104 processes transactions, such as data transfers between a source such as a user account and a destination such as a destination account for payment of a bill or transfer of funds, etc. The transaction data 120 can include any types of transactions from user devices such as a remote device 106 and/or other remote devices 110 for interacting with user accounts held on a transaction server. Transactions may include for example, loan applications, wire transfers, check deposit payments, withdrawals, ATM deposits, credit card interactions for accounts held on the transaction server 104, updates to identity information for accounts on the transaction server or to open/modify accounts (e.g. bank account, credit card, loans, etc.) with new identity information, stock purchases, insurance product purchases or modifications, etc. Transaction server 104 is configured to receive inputs from other computing devices, such as remote device 106 and other remote devices 110 to perform an action on a transaction, such as a bill payment data transfer with identification information for performing the action. As illustrated in FIG. 1, the transaction data 120 may comprise financial products data 124 (e.g. credit card, insurance, types of bank accounts, loan, etc.) available for use by the remote device 106 and other remote devices 110. The transaction data 120 may further comprise client financial data 126 which includes client account information such as client identity and transactions made including purchases, loan, mortgage, bank account, credit card, debit card, insurance information, etc. Additionally, the transaction data 120 may include financial events 122 such as scheduled payments (e.g. payment of dividends), changes to policies, depreciation of assets, etc. Thus, the financial events 122, financial products data 124 and client financial data 126 define parts of the transaction information (e.g. data transfer from a source account to a destination account, request for new account, request for update to existing account, etc.). The transaction data 120 may further include transaction size, location, time, device(s) used in transaction (e.g. remote device 106 and/or other remote devices 110), and purchase data (or deposit, transfer, account change data as relevant) stored as transaction identification data 123. The transaction data 120 is then communicated and/or monitored by the fraud detection server 112.

The fraud detection server 112 comprises a second processor 132, a second memory 134, a communication device (not shown) coupled thereto and one or more data stores such as a database 142 containing model data 136, fraud transaction data 138, and alert data 140. The fraud detection server 112 is configured to process the financial transactions provided by the transaction data 120 and perform real-time fraud detection. The fraud detection server 112 may utilize one or more machine learning and/or rule-based fraud detection models (e.g. stored as model data 136 within the database 142). The model data 136 may thus comprise a set of models (e.g. shown as model 1 . . . model X in FIG. 2) to be applied on the transaction data 120 for automatically detecting fraud. The rule-based fraud detection models may entail defined set of operations for performing several fraud detection scenarios, and the rules/thresholds for detecting when fraud occurs may be based on prior behaviour of fraud detected in transactions for the system 100. The machine learning based fraud detection models include processing large transaction based datasets (having various variables defining each transaction as per the transaction data 12) and finding hidden correlations between user behaviour defined in the transactions and the likelihood of fraudulent actions.

Figure 2:
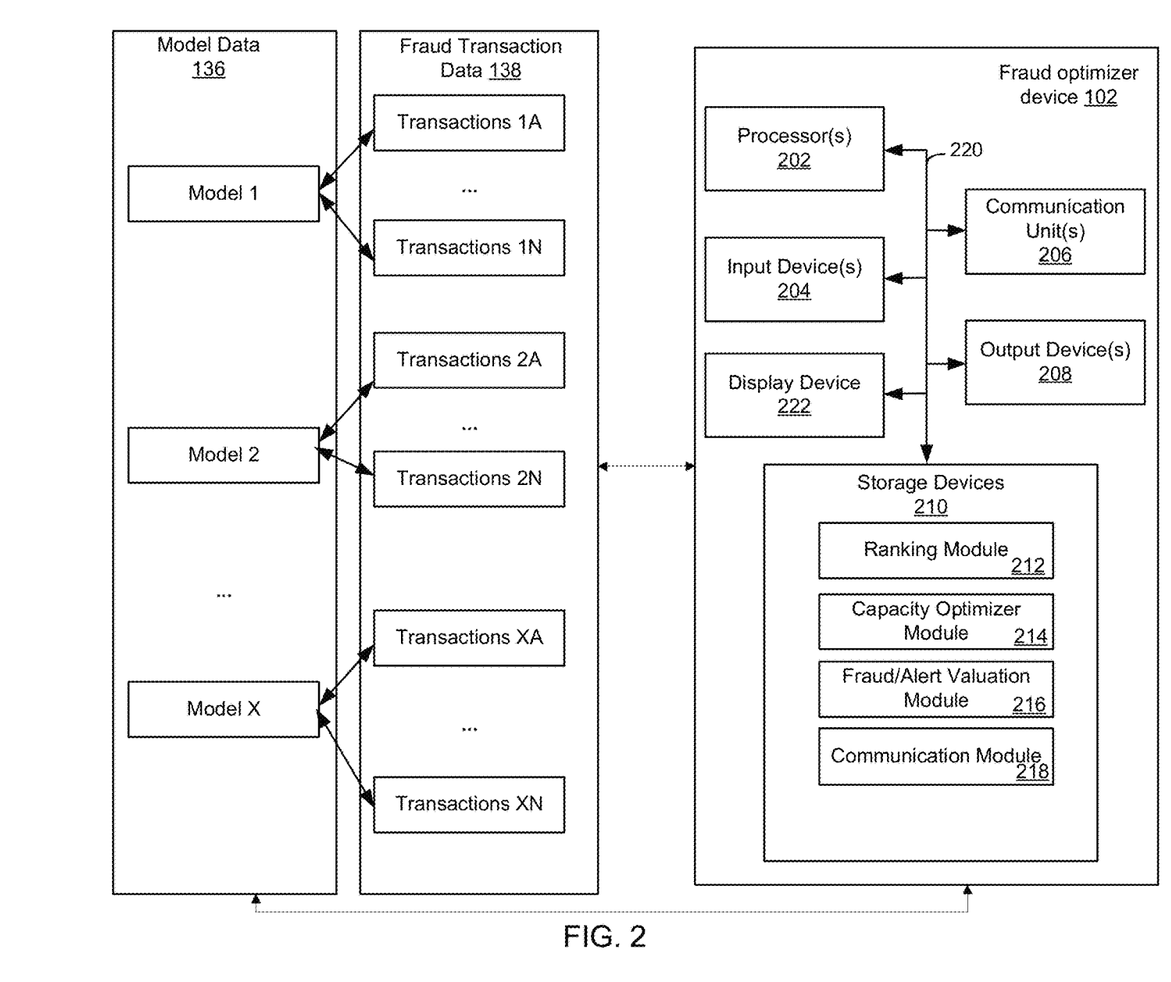
FIG. 2 is a diagram illustrating an example computing device (e.g. the fraud optimizer device of FIG. 1), in accordance with one or more aspects of the present disclosure.

Referring again to FIG. 1, in operation, the fraud detection server 112 stores a number of fraud detection strategies or models (e.g. rule based and/or machine learning based) within the model data 136 (e.g. model 1 . . . model X as shown in FIG. 2). The fraud detection server 112 is configured to implement multiple fraud detection strategies or models retrieved from the model data 136 in parallel on the transaction data 120 to determine a likelihood of fraud using each of the models. For example, from the transactions analyzed, a set of transactions, e.g. X transactions, may be flagged as fraudulent and identified in the fraud transaction data 138 by e.g. Y different strategies or models, in the model data 136. Upon detection of fraud in one or more transactions analyzed, the fraud detection server 112 is then configured to generate one or more alerts via alert data 140 to relevant computing devices (e.g. transaction server 104, remote device 106, and other remote devices 110). For example, such alerts generated for the X transactions may be used by the transaction server 104 to prevent any subsequent transactions related to the X transactions. This may include preventing transactions from any parties (e.g. remote device 106, other remote devices 110) involved with each of the X transactions. Alternatively, such automatically generated alerts may be used by the transaction server 104 for subsequent analysis, investigation and confirmation of the transaction data to determine whether fraudulent activity actually occurred. The alert data 140 may also include information about one or more computing devices (e.g. transaction server 104) subscribed for receiving the alert information for subsequent processing and action.

The fraud optimizer device 102 is configured to communicate with the fraud detection server 112 in real-time to obtain at least the model data 136 and the fraud transaction data 138. One of the problems to be addressed by the fraud optimizer device 102 is to determine which of the X transactions flagged by the fraud detection server 112 are the most valuable for the system 100 to be worked on for further analysis and which ones are the least important (e.g. and will consume unnecessary computing resources for investigation). As computational resources are typically limited and quick determination of problematic transactions are desired in order to flag or stop subsequent fraudulent transactions, in at least some aspects, it is desirable to optimize the fraud transaction strategies or models that are applied in the model data 136 and minimize the number of fraud transaction strategies in the model data 136 to limit overlap in detection.

The fraud optimizer device 102 is further configured to evaluate each of the models in the model data 136 to determine each model's net contribution to the overall fraud detection system while removing duplications and overlaps and generate a ranked list of the various fraud detection strategies or models using a customized forward selection technique. Notably, this approach evaluates each model in the model data 136 based on value of alerts for each of the fraud transactions in the fraud transaction data 138 (generated by the models), ranks the highest valued model and removes duplications (e.g. by removing transactions flagged by the current model from all other models) prior to ranking the next best model based on the value of the alerts for the transactions (looking at the filtered transactions having removed the duplicate ones) listed in the subsequent model (from the model data 136).

Generally, the fraud optimizer device 102 may leverage database automation techniques (e.g. Python, SQL) and the customized approach of forward selection to perform optimization and ranking of the various fraud detection strategies/models.

FIG. 2 is a diagram illustrating in block schematic form, an example computing device (e.g. the fraud optimizer device 102 shown in FIG. 1), in accordance with one or more aspects of the present disclosure, for example to provide a computing system for optimizing and ranking a plurality of fraud detection strategies while considering possible overlaps and duplication of transactions flagged. It is noted that although FIG. 1 illustrates the fraud detection server 112 applying the various models in the model data 136 and determining fraud transactions in the fraud transaction data 138, in at least some aspects, the fraud optimizer device 102 may be configured to apply some or all of the models in the model data 136 for determining the fraud transactions for the fraud transaction data 138.

The fraud optimizer device 102 comprises one or more processors 202, one or more input devices 204, one or more communication units 206 and one or more output devices 208. Fraud optimizer device 102 also includes one or more storage devices 210 storing one or more modules such as a ranking module 212, a capacity optimizer module 214, an alert valuation module 216, and a communication module 218.

Communication channels 220 may couple each of the components including processor(s) 202, input device(s) 204, communication unit(s) 206, output device(s) 208, display device 222, storage device(s) 210, ranking module 212, capacity optimizer module 214, alert valuation module 216, communication module 218 for inter-component communications, whether communicatively, physically and/or operatively. In some examples, communication channels 220 may include a system bus, a network connection, an inter-process communication data structure, or any other method for communicating data.

One or more processors 202 may implement functionality and/or execute instructions within the fraud optimizer device 102. For example, processors 202 may be configured to receive instructions and/or data from storage devices 210 to execute the functionality of the modules shown in FIG. 2, among others (e.g. operating system, applications, etc.). Fraud optimizer device 102 may store data/information (e.g. model data 136 and fraud transaction data 138 generated from fraud detection server 112 and/or locally generated) to storage devices 210. Some of the functionality is described further herein below.

One or more communication units 206 may communicate with external devices (e.g. computing devices shown in FIG. 1) via one or more networks (e.g. communications network 108) by transmitting and/or receiving network signals on the one or more networks. The communication units 206 may include various antennae and/or network interface cards, etc. for wireless and/or wired communications.

Input devices 204 and output devices 208 may include any of one or more buttons, switches, pointing devices, cameras, a keyboard, a microphone, one or more sensors (e.g. biometric, etc.) a speaker, a bell, one or more lights, etc. One or more of same may be coupled via a universal serial bus (USB) or other communication channel (e.g. 220).

The one or more storage devices 210 may store instructions and/or data for processing during operation of fraud optimizer device 102. The one or more storage devices 210 may take different forms and/or configurations, for example, as short-term memory or long-term memory. Storage devices 210 may be configured for short-term storage of information as volatile memory, which does not retain stored contents when power is removed. Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Ranking module 212 may be configured to receive an input of model data 136 comprising a set of fraud detection models (e.g. Model 1, Model 2, . . . Model X) applied to transactions (e.g. transaction data 120) which generates fraud transaction data 138. Notably, for each model applied from the model data 136, a set of fraud transactions may be generated shown as the fraud transaction data 138 (e.g. via the fraud detection server 112 and/or fraud optimizer device 102). As illustrated in the example of FIG. 2, applying fraud detection Model 1 may generate fraud transactions 1A . . . 1N; applying fraud detection Model 2 may generate fraud transactions 2A . . . 2N; applying fraud detection Model X may generate transactions XA . . . XN. These are shown in simplified form and for illustration purposes of an example set of models and generated transactions.

Initially, alert valuation module 216 is configured to analyze the transactions in the fraud transaction data 138 and determine a value for generating an alert for each of such transactions flagged as fraud. The value may be calculated based on a pre-defined equation for determining benefit of generating an alert for each of the flagged fraud transactions (e.g. transactions 1A . . . 1N; 2A . . . 2N; XA . . . XN). The valuation performed by the alert valuation module 216 of each alert for flagging a transactions as fraudulent (e.g. transaction 1A . . . 1N by Model 1) may be based of factors including but not limited to: accuracy, on-paper monetary value, operational cost, and product revenue associated with product(s) in the transactions. In at least one aspect, the alert valuation module 216 may generate a difference between average fraud on paper saving and average operational cost needed to process the fraudulent transaction claim.

Example calculations of the fraud valuation equation for determining the fraud value applied by the alert valuation module 216 include one or more of the following:
  a. Value of alert (for flagging a transaction as fraud)= average fraud on paper saving (pre-defined savings associated with flagging a transaction as fraud)–average operational cost needed to process.
  b. Value of alert (for flagging a transaction as fraud)= average fraud on paper saving (pre-defined savings associated with flagging a transaction as fraud)+average fraud avoidance on remaining balance–average operational cost need to process (operational cost needed to process the transaction as fraudulent)–average product revenue lost due to potential false alerts.

The examples above are not meant to be limiting.

Ranking module 212 may use an input of model data 136 (e.g. containing models 1 . . . X) and fraud transaction data 138 (containing corresponding transactions flagged as fraud, namely transactions 1A . . . 1N; 2A . . . 2N; XN . . . XN). The ranking module 212 may retrieve from the fraud detection server 112, a set of all transactions with fraud alerts in a given time (e.g. fraud transaction data 138). In at least some aspects, the ranking module 212 may be configured to identify from the transactions set (e.g. fraud transaction data 138), all the rules/models which generated the fraud data. For the models provided in the model data 136 from the fraud detection server 112 (or alternatively identified from the transaction pool in the fraud transaction data 138), the ranking module 212 utilizes the alert valuation module 216 to determine fraud value for each alert for each model. For example, the alert valuation module 216 may calculate an overall fraud value per alert, e.g. an average fraud value per alert. That is for model 1, the fraud value for each transaction 1A . . . 1N is calculated and the average value per alert is computed for model 1. The same process is repeated for all other models, e.g. model 2 . . . model X to calculate an average face value per alert. As noted above, this valuation is a pre-defined equation and may be based on the above-noted factors such as operational costs, product revenue, on paper savings, etc. In some implementations, the overall fraud value is calculated as one or more of: a mean, a median, a mode, a midpoint, and a root mean square (RMS) based on the fraud value for all of the potentially fraudulent transactions per each of the strategies or models being considered. The ranking module 212 is then configured to identify the single rule/model with the highest benefit based on the fraud valuation equation applied by the alert valuation module 216. In some implementations, this may include the highest benefit being the highest overall fraud value per transaction per strategy. In the current implementation, this rule/model having the highest benefit (e.g. model 1 having the highest average fraud value per alert or flagged transaction including transactions 1A . . . 1N) is ranked at the highest priority on the ranking list. If there are existing entries on the ranking list, then the currently identified model (e.g. model 1) is slotted after existing entries. In order to remove duplicates or overlaps, the ranking module 212 is configured to purge transaction records related to transactions that were alerted/flagged by this identified model. That is, if the identified model is model 1 having corresponding transactions 1A . . . 1N, the ranking module 212 is configured to search within flagged transactions (e.g. fraud transaction data 138) for all remaining models from the model data 136 to be ranked, e.g. model 2 . . . model X, and determine if any of the other remaining transactions from the fraud transaction data 138 e.g. transactions 2A . . . 2N; . . . transactions XA . . . XN match any of the transactions 1A . . . 1N. If any of the remaining transactions match or otherwise similar to transactions 1A . . . 1N; they are removed as overlapping or duplicates.

The ranking module 212 is configured to repeat the ranking process described above until there are no further transactions in the fraud transaction data 138 to be considered (e.g. all transactions are accounted for in the ranked list while removing duplicates). Once there are no further models from model data 136 and/or transactions in fraud transaction data 138 to be considered, the ranking module 212 may communicate with the communication module 218 to provide the ranked list of models to the fraud detection server 112 to update the model data 136 stored thereon for subsequent use of the ranked list of models for fraud detection and flagging subsequent transactions.

In some aspects, the capacity optimizer module 214 may contain pre-defined and/or determined specifics on processing and/or resource capacity of the system 100 and thus be configured to have a threshold of number of models to be applied from the model data 136; number of transactions being flagged in the fraud transaction data 138; and/or acceptable value for fraud value calculated by alert valuation module 216. Thus, the ranked list generated by the ranking module 212 may further be filtered down by the capacity optimizer module 214 to account for optimal capacity of the system 100 (e.g. resource capacity allocated by fraud detection server 112 for identification of fraud transactions).

It is understood that operations may not fall exactly within the modules 212, 214, 216, and 218 of FIG. 2 such that one module may assist with the functionality of another.

Figure 3:
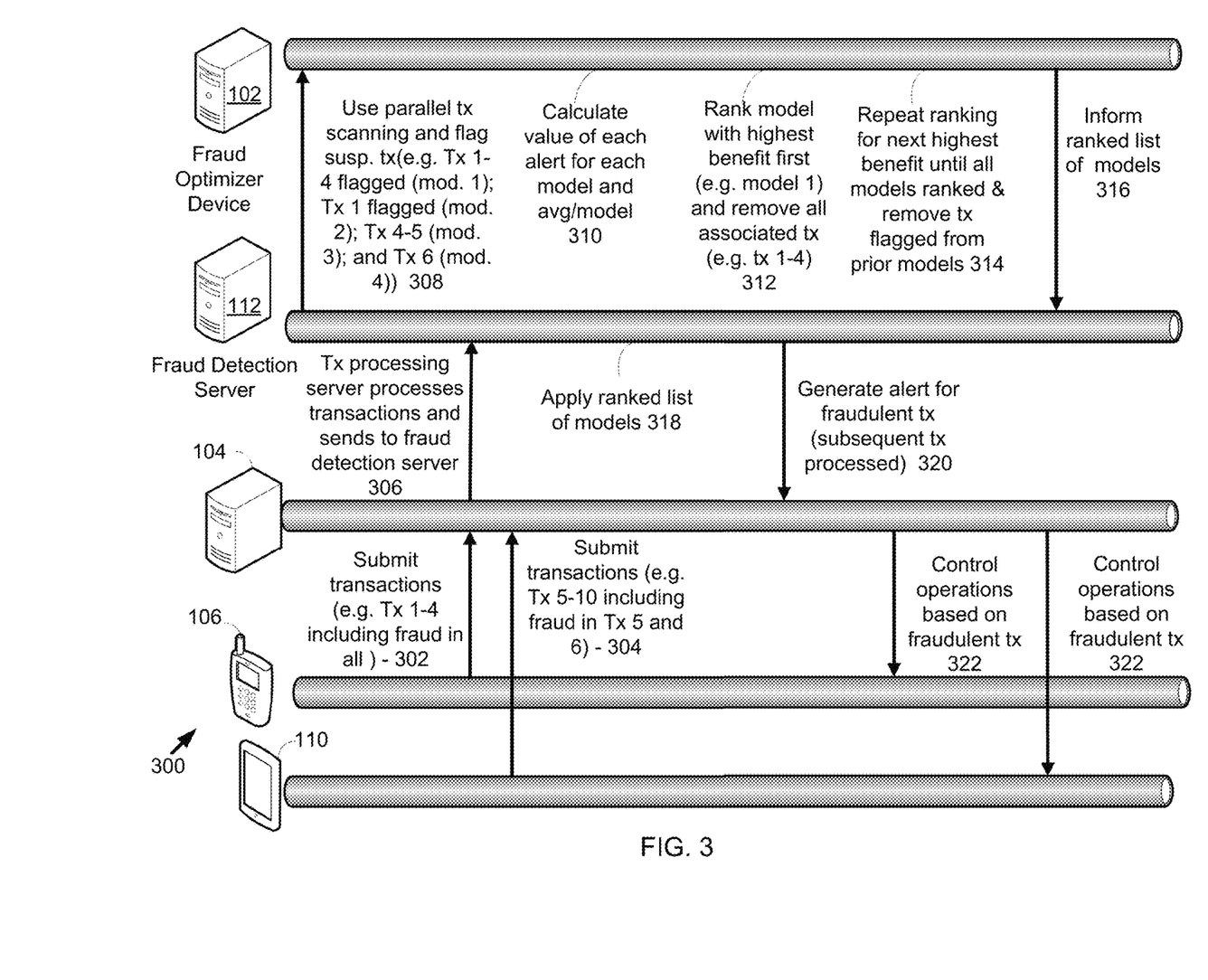
FIG. 3 is a diagram illustrating an example flow of operations and interactions between the computing devices of FIG. 1 including the fraud optimizer device, a fraud detection server, a transaction server, a remote device and other remote devices, in accordance with one or more aspects of the present disclosure.

Referring to FIG. 3, shown is an example flow chart of operations 300 for the system 100 shown in FIG. 1 and the fraud detection server 112 shown in FIG. 2. At steps 302 and 304, remote device 106 and other remote devices 110 communicate with transaction server 104 to perform transactions as described herein (e.g. opening new account, performing data transfers between a source and destination account, etc.). In the example shown, remote device 106 performs transactions 1-4 (each containing fraudulent behaviour) and other remote device 110 performs transactions 5-10 whereby transaction 5 and 6 may include fraud. Transaction server 104 receives the transactions and processes the transactions (e.g. logs the transactions within a database and may associate any existing account information with the transactions provided). At step 306, the transaction server 104 sends the transactions received (and any associated metadata information retrieved from the transaction server 104 including for example, prior historical data associated with accounts for the transactions under consideration) to the fraud detection server 112 for further processing and detection of fraudulent transactions. At step 308, fraud detection server 112 applies a set of pre-defined fraud detection models (e.g. models 1-4) to the received transaction data. Notably, at step 308, the fraud detection server 112 uses parallel transaction scanning and flags suspicious transactions utilizing the fraud detection models stored thereon. In the example illustrated, transactions 1-4 may be flagged by model 1; transaction 1 flagged by model 2; transaction 1 flagged by model 2; transactions 4-5 flagged by model 3; transaction 6 flagged by model 4. At step 310, the fraud optimizer device 102 calculates a fraud value (e.g. value of each alert for each model) and an overall fraud value, e.g., an average fraud value (average of fraud values for the transactions flagged for the particular model). In some implementations, the overall fraud value is calculated as one or more of: an average, a mean, a median, a mode, a midpoint, and a root mean square (RMS) based on the fraud value for all of the potentially fraudulent transactions per each of the strategies or models being considered. Referring again to FIG. 3, based on the average fraud value calculated per model, at step 312, the fraud optimizer device 102 ranks the model with the highest benefit first (e.g. the model with the highest average fraud value for that model). In the example illustrated, it is assumed that model 1 has the highest benefit and is thus moved to the top of the ranked list for models and all transactions associated with model 1 (e.g. transactions 1-4 flagged are removed from all other models as well so that there is no duplication). Thus, transaction 1 may be removed from model 2 and model 3 so that subsequent fraud value evaluation does not consider these overlapping transactions (e.g. or in fact, model 2 in this case since there is no other transaction left in that model).

At step 314, the fraud optimizer device 102 repeats the ranking for all of the remaining models and transactions, that is, in this example, models 3-4 may be remaining for consideration. The ranking process is repeated for the next highest benefit (e.g. highest fraud value) until all models ranked while removing overlapping duplicate transactions. Thus, model 3 may be ranked next (considering only associated transaction 5), and then model 4 is ranked last in an example implementation.

As described in relation to FIG. 2, the steps of ranking and evaluating of the models may be performed via cooperation of the ranking module 212, alert valuation module 216 in communication with model data 136 (e.g. containing models 1-4) and fraud transaction data 138 (e.g. containing transactions 1-6).

At step 316, the fraud optimizer device 102 uploads the full list of ranked rules/models (e.g. model 1, 3 and 4) to a local database and communicates same to the fraud detection server 112. At step 318, the fraud detection server 112 applies the ranked list of models received (e.g. model 1, 3 and 4) for subsequent processing of fraud detection so that subsequent transactions may be processed according to the ranked list and giving priority to the identification provided in the highest ranked model.

At step 320, the fraud detection server 112 may process subsequent transactions received thereon and generate alert(s) or flags for fraudulent transactions by using the ranked list of models generated at step 318. The transactions flagged at the highest ranked model, may thus be considered first and more urgently than the next transactions (additionally higher priority may be provided to the highest ranked model). At step 322, in response to the alerts received at step 320, the transaction server 104 may controls operations of remote device 106 and/or other remote device 110. Controlling the operations may include for example, preventing further transactions from the corresponding device or account that has been associated with a flagged transaction until further analysis may be performed by the transaction server 104).

Figure 4:
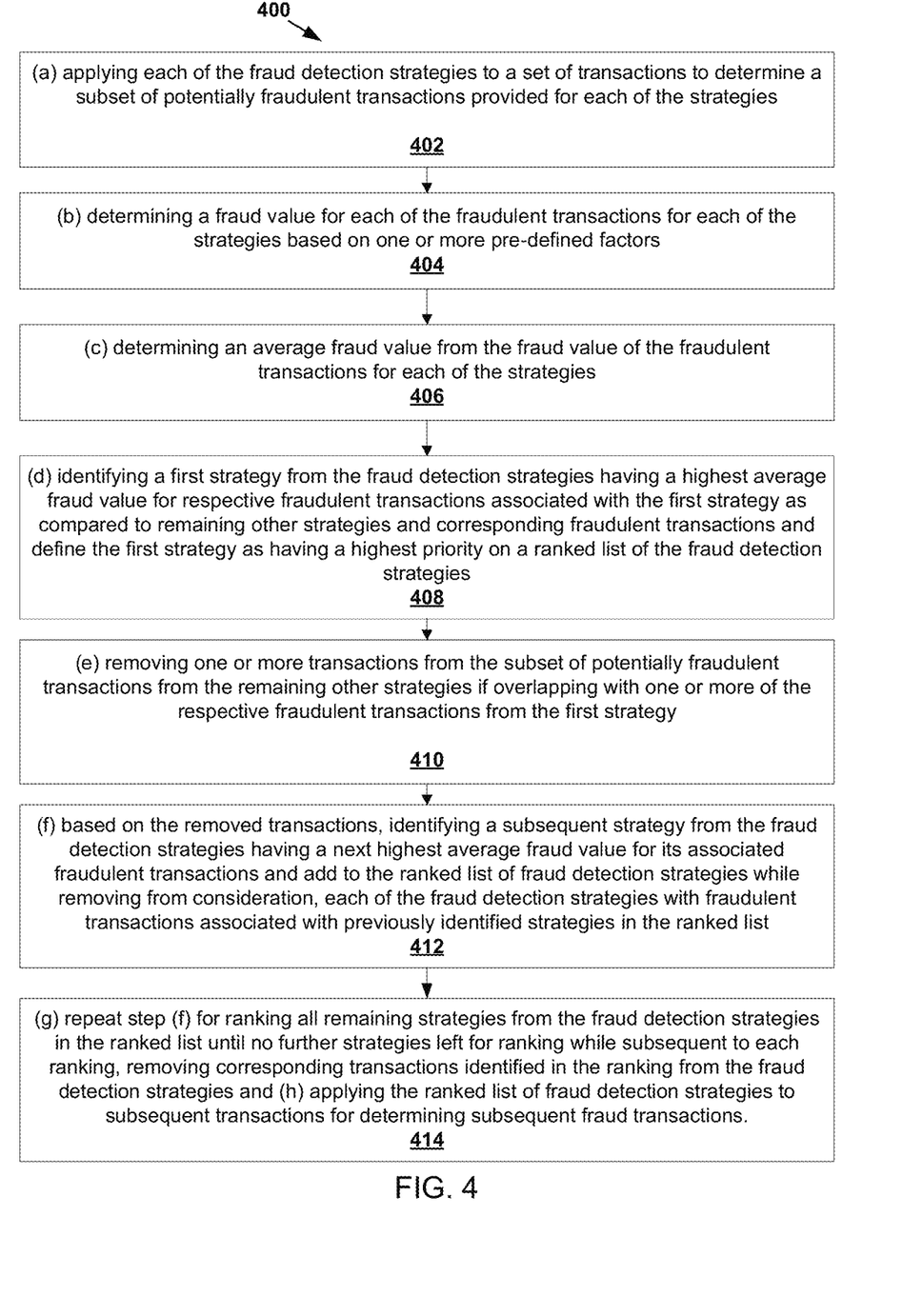
FIG. 4 is a flowchart illustrating example operations of the fraud optimizer device, in accordance with one or more aspects of the present disclosure.

FIG. 4 is a flowchart of operations 400, which may be performed by a computing device, such as the fraud optimizer device 102 of FIG. 2. As described with respect to FIG. 2, the computing device (e.g. the fraud optimizer device 102) may comprise a processor configured to communicate with other computing devices (e.g. transaction server 104, remote device 106, other remote device 110, and/or fraud detection server 112) to receive and process transactions and fraud detection models/strategies used to evaluate the transactions for fraud and determine a ranked list of preferred fraud detection models/strategies from the models such as to optimize the fraud detection process, in at least some aspects and efficiently utilize computer resources. The fraud optimizer device 102 is configured to communicate, via the processor with the external computing devices (e.g. to receive transactions, and/or fraudulent transactions and/or fraud detection models) and wherein instructions (stored in a non-transient storage device), when executed by the processor configure the fraud optimizer device 102 to perform operations such as operations 400.

Referring to FIGS. 1, 2 and 4, at step 402 of FIG. 4, operations of the fraud optimizer device 102 may retrieve from a local storage and/or receive from another computing device (e.g. fraud detection server 112 of FIG. 1), a set of current fraud detection strategies/models to be used for detecting fraud in transactions communicated across the system 100 (e.g. machine learning models, or rule-based models). Additionally, at step 402, operations of the fraud optimizer device 102, apply each of the fraud detection strategies or models (e.g. model data 136) to a set of transactions (e.g. transactions received from transaction server 104) to determine a subset of potentially fraudulent transactions (e.g. fraud transaction data 138) provided from each of the fraud detection strategies. As shown in FIG. 2 for example, by applying a set of models (e.g. model data 136) to transactions communicated across the system 100, model 1 may generate fraudulent transactions 1A . . . 1N; model 2 may generate fraudulent transactions 2A . . . 2N; model X may generate fraudulent transactions XA . . . XN.

It is noted that in some aspects, the fraud optimizer device 102 may receive externally or retrieve locally raw transactions, not having been processed for fraud from the system 100 and raw model data to be applied (e.g. model data 136) and thereby process the transactions for fraud to generate the fraud transaction data 138. In at least some other aspects, the fraud transaction data 138 may be generated via one or more other computing devices of the system 100 (e.g. fraud detection server 112) and then received at the fraud optimizer device 102 for subsequent processing. In yet other aspects, a combination of externally generated fraud transaction data 138 via associated models and internally generated fraud transaction data 138 may be available to the fraud optimizer device 102 for subsequent processing. In at least some other aspects, where the fraud optimizer device 102 may receive fraud transaction data 138 and may deduce from the transaction data, the type of fraud detection strategy/model applied to generate said data thereby retrieving the model data 136 for deciphering the fraud transaction data 138.

Referring again to FIG. 4, at step 404, operations may determine, based on applying a pre-defined equation of one or more pre-defined factors, a fraud value for each of the fraudulent transactions generated from applying each of the fraud detection models/strategies. Applying the pre-defined equation of the one or more factors, may include in one example, that the value of an alert is the difference between the average on-paper saving value for detecting fraud and the average operational cost needed to process the alert. In another aspect, the pre-defined equation may determine the true value of the alert as the average on paper saving value for detecting fraud added to the average fraud avoidance on remaining balance of an account associated with the fraud and subtracting the average operational cost needed to process and subtracting average product revenue lost due to false alerts. The pre-defined factors for determining fraud value may include one or more of the following: accuracy, on-paper monetary value, operational cost, product revenue, and any combination of the above. This pre-defined equation based on the defined factors preferably provides a single yet holistic metric that evaluates the value of the alerts in the system for later optimization use.

At step 406, the operations configure the fraud optimizer device 102 to determine for each of the strategies, an average fraud value per transaction being flagged as fraudulent. For example, for model 1 shown in FIG. 2, a fraud value is calculated for each of the transactions 1A . . . 1N; then an average fraud value per transaction is calculated for the model. The process is repeated for all models. At step 408, the fraud detection strategy (e.g. selected from models 1 . . . X of FIG. 2) having the highest average fraud value per transaction as compared to the other strategies being ranked is selected as having a highest priority (e.g. a first strategy) on a ranked list of the fraud detection strategies.

At step 410, flagged fraud transactions from the first strategy (e.g. model 1) which occur in other fraud detection strategies (e.g. model 2) are removed from those strategies so that there is no overlap or duplication in considering the transactions. That is, operations of the fraud optimizer device 102 cause removing of transaction(s) from the set of potentially fraudulent transactions for all remaining models to be considered which have already occurred in the fraud detection strategy ranked as having the highest average fraud value (e.g. in this case the first strategy or model 1) thereby removing the overlap so that transactions are not considered again as contributing to a model's worth for fraud value.

At step 412, operations of the fraud optimizer device 102 determine from the remaining fraud detection strategies (which may have had transactions removed from their association if overlap with a previously ranked strategy), a particular strategy with the next highest average fraud value to select and rank while the process of removing duplicate transactions (e.g. transactions associated with the particular strategy which occur in the remaining strategies) is repeated.

At step 414, for all remaining strategies, the step of determining the fraud value for each model and ranking the next highest model having the next highest average fraud value is repeated by the fraud optimizer device 102 until there are no further strategies to rank and consider. That is, the step of identifying a subsequent strategy to rank based on the next highest average fraud value is repeated until no further fraud detection strategies are left for ranking while subsequent to each ranking, removing corresponding transactions already identified in the ranking from the fraud detection strategies ranked. Step 414, further comprises applying the ranked list of fraud detection strategies (which may be capped) to subsequent transactions flowing through system 100 (e.g. as provided from the transaction server 104 to the fraud detection server 112) for determining subsequent fraud transactions. In some aspects step 414 may include providing the ranked fraud detection strategies or models to an external computing device for applying the ranked model (e.g. the fraud detection server 112).

Figure 5:
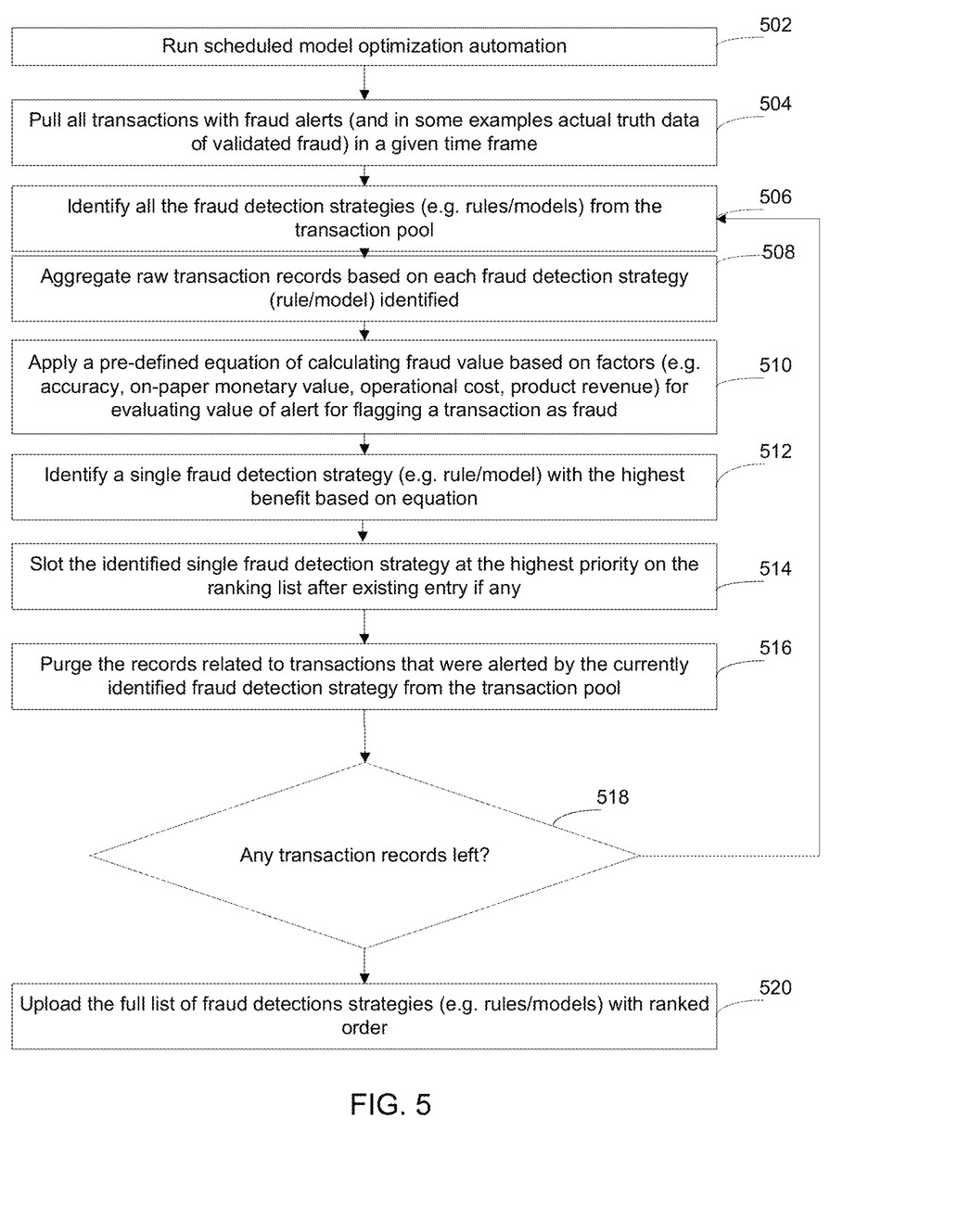
FIG. 5 is a flowchart illustrating example operations of the fraud optimizer device, in accordance with one or more aspects of the present disclosure.

Referring to FIG. 5, shown is a flowchart of example operations of the fraud optimizer device 102 of FIGS. 1, 2 and 3, in accordance with an aspect of the present disclosure. The proposed operations utilize a customized forward selection algorithm to facilitate ranking and optimization of the fraud detection strategies.

Initially, the fraud optimizer device 102 may have a set of one or more pre-defined factors or metrics (e.g. average face value of the fraud) for the fraud detection strategies or models (e.g. shown as model data 136 in FIG. 2 storing models 1 . . . X) to be evaluated. Generally, the fraud detection server 112 may receive a set of transactions (via transaction data 120) from the system 100, and runs in parallel, the fraud detection strategies (e.g. model 1, . . . model X in model data 136) against all of the transactions (e.g. transaction data 120 received from the transaction server 104) to determine suspicious transactions shown as fraud transaction data 138.

In turn at step 502, the fraud optimizer device 102, starts the automated process of evaluating and optimizing the fraud detection strategies or models in the model data 136 used by the fraud detection server 112. At step 504, the fraud optimizer device 102 is configured to pull all transactions with fraud alerts over a given time period (e.g. fraud transaction data 138). At step 506, the fraud optimizer device 102 is configured to identify all of the fraud detection strategies (e.g. rules/models) from the received transaction pool (e.g. fraud transaction data 120). Alternately, the fraud detection strategies may be received as a set of models applied as model data 136 to generate the fraud transaction data 138 from the fraud detection server 112. At step 508, the fraud optimizer device 102 is configured to aggregate raw transaction records based on each fraud detection strategy (rule/model) identified. This may include as shown in FIG. 2, associating transactions from the fraud transaction data 138 with corresponding models in the model data 136.

At step 510, the fraud optimizer device 102 is configured to evaluate each of the fraud detection strategies (e.g. model 1 . . . model X in the model data 136) using the pre-defined equation and corresponding factors/metrics (e.g. average fraud face value per transaction flagged as fraudulent).

At step 512, the fraud optimizer device 102 is then configured to select a single fraud detection strategy (e.g. model 1 in model data 136 which outputs a first set of transactions 1A . . . 1N indicated as potential fraud) as a first priority strategy. The first priority strategy is selected based on its transactions having the highest value for that pre-identified factor/metric. For example, such metric may include the highest average fraud face value for the transaction over a period of time. At step 514, the first priority strategy is slotted at the highest priority on the ranking list after existing entries on the ranking list, if any.

At step 516, one or more transaction records related to transactions that were alerted by the currently identified fraud detection strategy are purged from the transaction pool. That is, amongst all the remaining strategies, the fraud optimizer device 102 is configured to filter out the transactions (and if no transactions left, then the strategies) which correspond to the currently identified fraud detection strategy (e.g. T1 . . . TN) as it has already been covered by the prior selected strategies.

Then, at step 518, the fraud optimizer device 102 is configured (e.g. via the ranking module 212) to consider the next best fraud detection strategy (e.g. models 2 . . . N) to select based on highest factor value (e.g. next highest average fraud face value per alert) over the same time period. The process repeats until no strategies are remaining and at each stage the strategies associated with transactions having already been considered (e.g. where those prior strategies were already included in the ranked list) are removed from consideration.

For example, a first strategy could identify transactions A, X, Y and Z as suspicious; a second strategy could identify transaction A as suspicious. This process of ranking described allows ranking of the strategies while removing the overlap. The fraud detection strategies or models described herein can include for example, a machine learning model, logistical regression, neural networks, etc. The strategies are configured to scan against the same set of transactions and determine risky or suspicious transactions. The disclosed method and system facilitates ranking the strategies to minimize overlap.

At step 520, the fraud optimizer device 102 is configured to upload a full list of fraud detection strategies (e.g. as fraud transaction data 138) with their ranked order to a database (e.g. storage device 210 or database 142 of the fraud detection server 112) for subsequent use and application of the ranked list of fraud detection strategies.

In at least some aspects, the process of ranking can also include a threshold value such that strategies resulting in transactions with values determined from metrics below the threshold are not considered. The threshold may be adjusted based on the limited computing resources available.

In at least some aspects, the process of ranking (e.g. as performed in FIGS. 1, 2, 4 and 5), include value-based fraud case optimization. Some of the metrics used to provide values of each alert for the flagged transactions as possibly suspicious include face value of transaction, first layer of investigation costs, second layer of investigation cost (e.g. adjudication cost), operational cost to investigators, potential payout to clients, potential client damage cost to identity as fraud, future value, potential fraud exposure, etc.

Alternatively, a single equation is applied using a number of metrics as variables to produce a single yet holistic metric that evaluates the value of alerts for optimization use. In at least some aspects, the present system is dynamic and time dependent as different ranking of strategies could result based on the specific past time periods examined.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow. Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A computer implemented method for optimizing at least one machine learning model in real-time, the method comprising performing the following steps by a processor:
   (a) applying each of a plurality machine learning based fraud detection strategies of the at least one machine learning model to a set of transactions to determine a subset of potentially fraudulent transactions provided for each of the strategies,
   (b) determining a fraud value for each of the potentially fraudulent transactions for each of the strategies based on one or more pre-defined factors, wherein the fraud value is a monetary value;
   (c) determining an overall fraud value from the fraud value of the potentially fraudulent transactions for each of the strategies;
   (d) identifying a first strategy from the machine learning based fraud detection strategies having a highest overall fraud value for respective potentially fraudulent transactions associated with the first strategy as compared to remaining other strategies and corresponding potentially fraudulent transactions and define the first strategy as having a highest priority on a ranked list of the machine learning based fraud detection strategies; wherein the step of applying the plurality of machine learning based fraud detection strategies is performed in parallel for all of the fraud detection strategies and concurrently to all the transactions in the set so that the fraud value for each of the potentially fraudulent transactions are calculated and compared at a same time point;
   (e) removing one or more transactions from the subset of potentially fraudulent transactions from the remaining other strategies that overlap with one or more of the respective potentially fraudulent transactions from the first strategy;
   (f) identifying a subsequent strategy from the machine learning based fraud detection strategies having a next highest overall fraud value for its associated potentially fraudulent transactions and add to the ranked list of machine learning based fraud detection strategies while removing from consideration, each of the machine learning based fraud detection strategies with potentially fraudulent transactions associated with previously identified strategies in the ranked list;
   (g) repeat step (f) for ranking all remaining strategies from the machine learning based fraud detection strategies in the ranked list until no further strategies left for ranking while subsequent to each ranking, removing corresponding transactions identified in the ranking from the machine learning based fraud detection strategies;
   (h) applying in real-time the ranked list of machine learning based fraud detection strategies to subsequent transactions for determining subsequent potentially fraudulent transactions.

2. The method of claim 1, wherein the overall fraud value is calculated as an average of the fraud value for all of the potentially fraudulent transactions per each of the strategies.

3. The method of claim 1, wherein the overall fraud value is calculated as one or more of: a mean, a median, a mode, a midpoint, and a root mean square (RMS) based on the fraud value for all of the potentially fraudulent transactions per each of the strategies.

4. The method of claim 2, wherein in step (g), a predefined number of the machine learning based fraud detection strategies are selected and applied based on a pre-defined processing capacity for a computing device to perform fraud detection.

5. The method of claim 2, wherein the pre-defined factors for determining the fraud value are based on at least one of: operational cost, monetary value, and product revenue for the transaction.

6. The method of claim 5, wherein determining the fraud value is further determined based on historical data for a past time period for each of the potentially fraudulent transactions.

7. The method of claim 2, wherein the average of the fraud value is calculated for all of the transactions flagged as fraudulent for each of the machine learning based fraud detection strategies.

8. The method of claim 2, wherein the fraud value represents a true value of generating an alert on the computing device flagging fraud, the fraud value being a difference of average fraud on paper saving and average operational cost required to process the alert.

9. The method of claim 2, wherein the fraud value represents a true value of generating an alert on the computing device flagging fraud, the fraud value determined as sum of: average fraud on paper saving; and average fraud avoidance on remaining balance and subtracting a second sum of: average operational cost needed to process the alert and average product revenue lost due to false alert based on the alert.

10. A computer program product comprising a non-transient storage device storing instructions that when executed by at least one processor of a computing device for optimizing at least one machine learning model in real-time, configure the computing device to:
   (a) apply each of a plurality of machine learning based fraud detection strategies of the at least one machine learning model to a set of transactions to determine a subset of potentially fraudulent transactions provided for each of the strategies;
   (b) determine a fraud value for each of the potentially fraudulent transactions for each of the strategies based on one or more pre-defined factors, wherein the fraud value is a monetary value;
   (c) determine an overall fraud value from the fraud value of the potentially fraudulent transactions for each of the strategies;
   (d) identify a first strategy from the machine learning based fraud detection strategies having a highest overall fraud value for respective potentially fraudulent transactions associated with the first strategy as compared to remaining other strategies and corresponding potentially fraudulent transactions and define the first strategy as having a highest priority on a ranked list of the machine learning based fraud detection strategies;
   wherein the step of applying the plurality of machine learning based fraud detection strategies is performed in parallel for all of the fraud detection strategies and concurrently to all the transactions in the set so that the fraud value for each of the potentially fraudulent transactions are calculated and compared at a same time point;
   (e) remove one or more transactions from the subset of potentially fraudulent transactions from the remaining other strategies that overlap with one or more of the respective potentially fraudulent transactions from the first strategy;
   (f) identify a subsequent strategy from the machine learning based fraud detection strategies having a next highest overall fraud value for its associated potentially fraudulent transactions and add to the ranked list of machine learning based fraud detection strategies while removing from consideration, each of the machine learning based fraud detection strategies with potentially fraudulent transactions associated with previously identified strategies in the ranked list;
   (g) repeat step (f) to rank all remaining strategies from the machine learning based fraud detection strategies in the ranked list until no further strategies left for ranking while subsequent to each ranking, removing corresponding transactions identified in the ranking from the fraud detection strategies;
   (h) apply in real-time the ranked list of machine learning based fraud detection strategies to subsequent transactions for determining subsequent potentially fraudulent transactions.

* * * * *